United States Patent [19]
Paton et al.

[11] 3,984,125
[45] Oct. 5, 1976

[54] SELF-CONTAINED FRICTIONALLY DAMPED RESILIENT SUSPENSION SYSTEM

[76] Inventors: Hamilton Neil King Paton, 2521 W. Montlake Place E., Seattle, Wash. 98112; John B. Skilling, 3000 Webster Pt. Road NE., Seattle, Wash. 98105; Frank F. Smith, 914 N. 79th, Seattle, Wash. 98103

[22] Filed: Aug. 8, 1974

[21] Appl. No.: 495,656

Related U.S. Application Data

[63] Continuation-in-part of Ser. No. 457,425, April 3, 1974, abandoned.

[52] U.S. Cl. .............................. 280/716; 267/63 R
[51] Int. Cl.² .......................................... B60G 11/24
[58] Field of Search ............... 280/124 R, 671, 687, 280/716; 267/21 R, 63 R, 63 A, 153, 57.1 R, 57.1 A

[56] References Cited
UNITED STATES PATENTS

| | | | |
|---|---|---|---|
| 1,772,414 | 8/1930 | Brooke-Hunt | 267/21 |
| 3,482,852 | 12/1969 | Hickman | 280/124 R |
| 3,515,382 | 6/1970 | Gallagher | 267/153 |
| 3,677,535 | 7/1972 | Beck | 267/153 |
| 3,687,478 | 8/1972 | Willetts | 267/21 R |
| 3,811,700 | 5/1974 | Moore | 280/124 R |
| 3,819,206 | 6/1974 | Aarons | 267/153 |
| 3,895,819 | 7/1975 | Willetts | 280/124 R |

*Primary Examiner*—M. H. Wood, Jr.
*Attorney, Agent, or Firm*—Dowrey & Cross

[57] ABSTRACT

A mobile vehicle shock insulated suspension system is provided with unique variable rate elastomer springs and co-related variable rate friction damping system.

30 Claims, 20 Drawing Figures

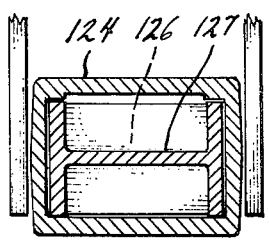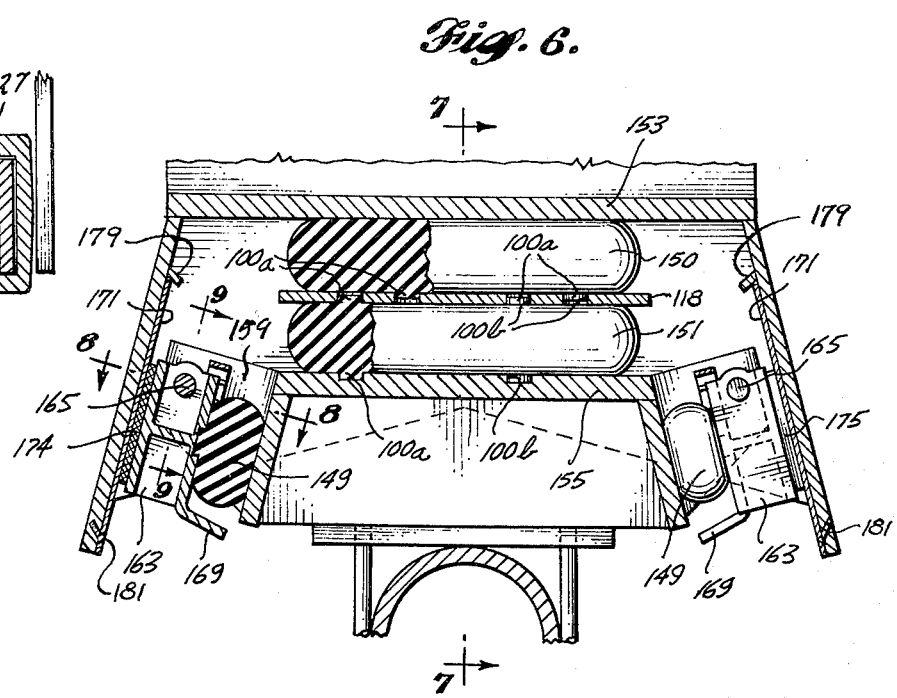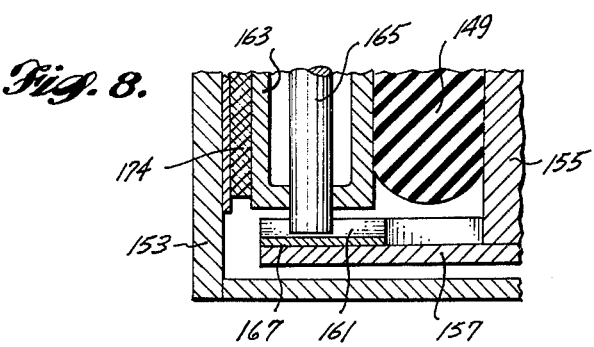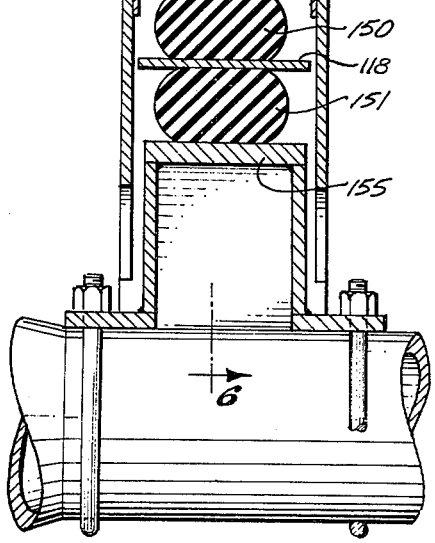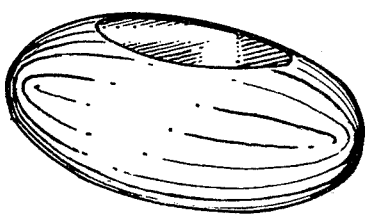

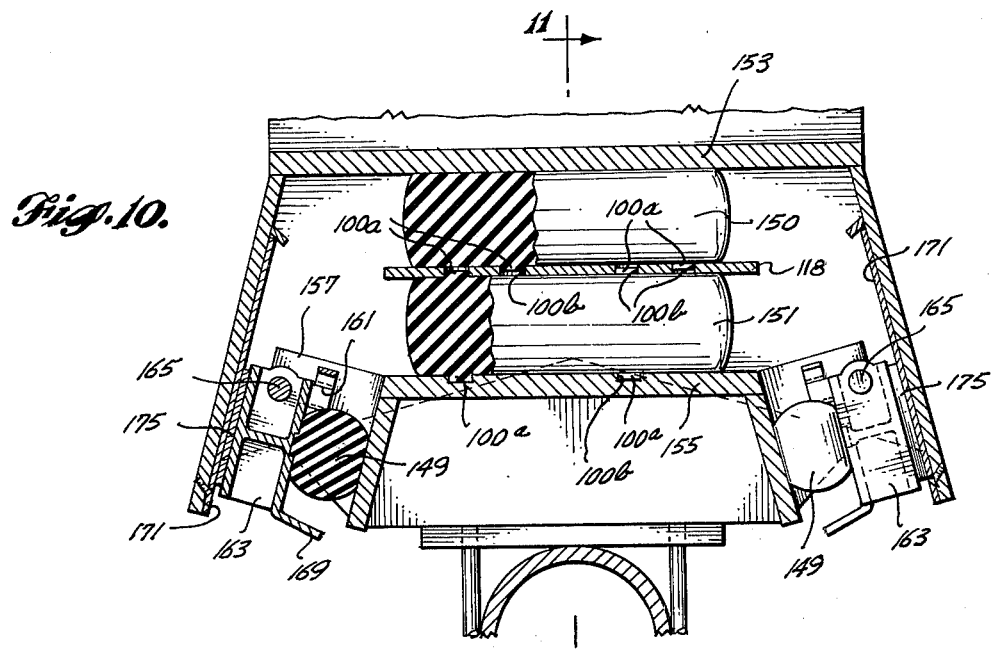

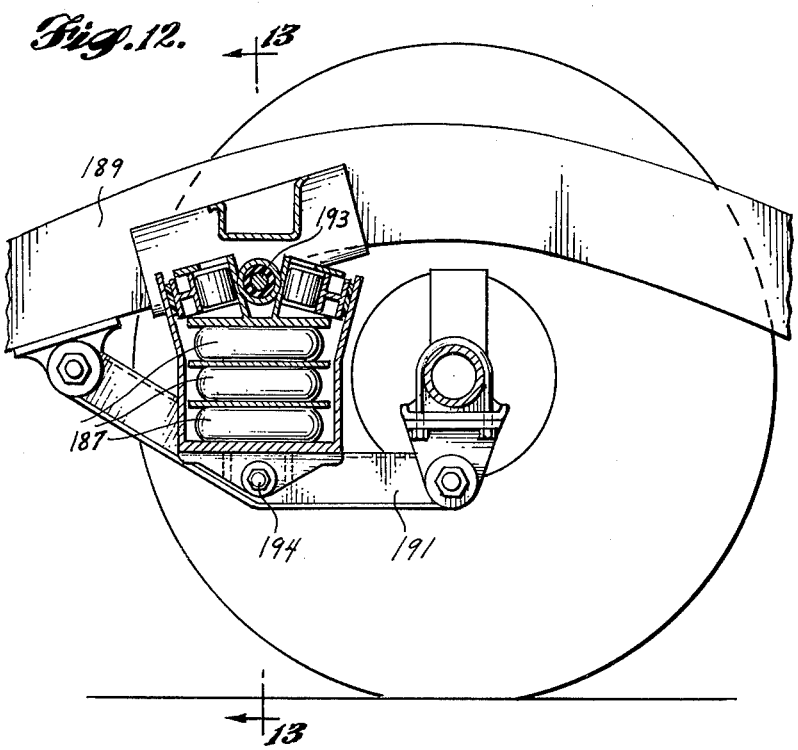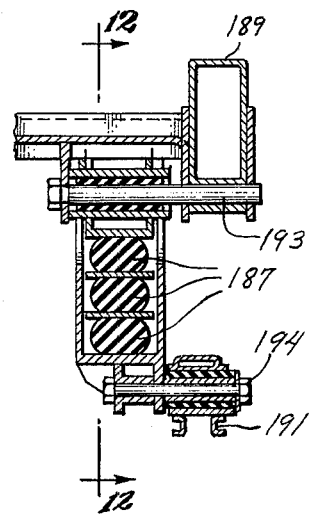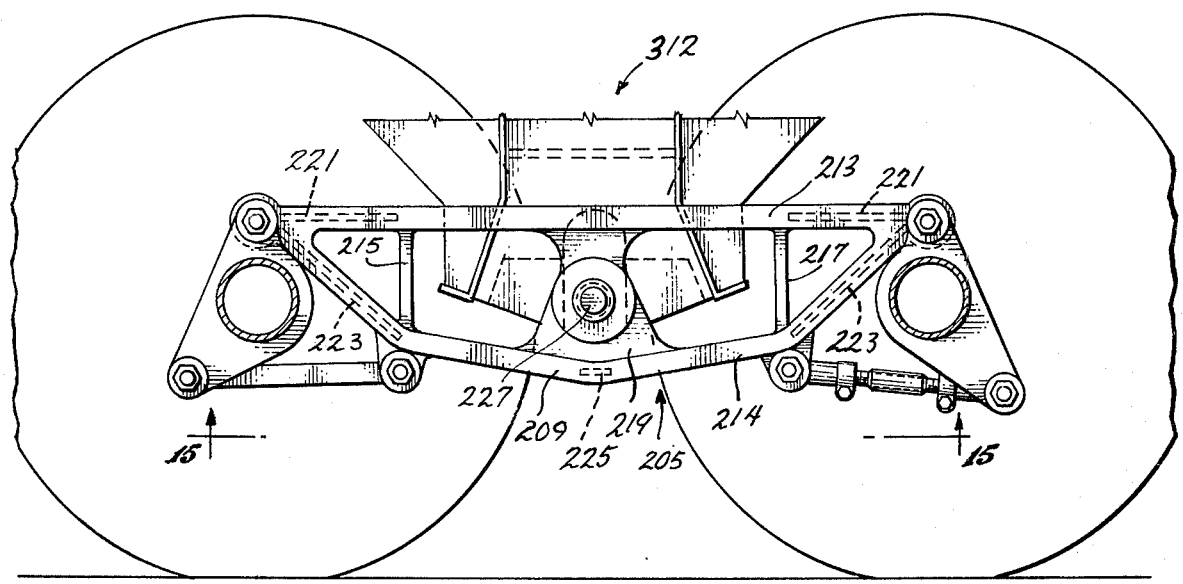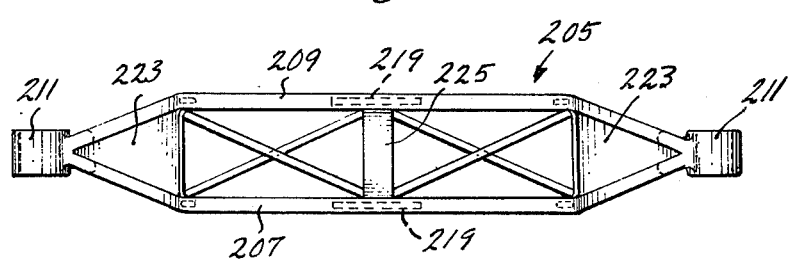

SELF-CONTAINED FRICTIONALLY DAMPED RESILIENT SUSPENSION SYSTEM

CROSS REFERENCE TO RELATED APPLICATIONS

This application is a continuation-in-part of application Ser. No. 457,425, filed Apr. 3, 1974, now abandoned.

BACKGROUND OF THE INVENTION

1. Field of the Invention

This invention pertains to suspension systems for tractors, trailers and other rubber tired vehicles and to the various novel elements which make up such a suspension system.

2. Description of the Prior Art

Most conventional suspension systems for mobile rubber tired vehicles have heretofore utilized steel springs or rubberized fabric "air bags." Such steel springs are in general constant rate type steel springs which are designed for the average load anticipated to be carried by the vehicle. For light lading, steel springs tend to be overly stiff causing accelerations to the lading which are damaging to it and heavily loaded vehicles have insufficient spring stiffness resulting in the vehicle frequently engaging the spring stops or bumpers causing impact forces to the vehicle and thus damaging the lading. Steel springs also have high vibration and shock transmissibility which causes equipment and lading damage. Air bag suspensions require ancillary shock absorbers and anti-bottom rubber stops. The air bags are costly, heavy, maintenance prone and require a source of compressed air.

Rubber sandwich type suspensions have been designed which to some extent alleviate the shortcoming of standard steel springs. An inherent disadvantage of these shear compression springs is their inherent lack of critical damping in the elastomer. These shear compression springs tend to be linear as applied and are nearly constant rate springs thus resulting in all of the inherent difficulties described above with reference to steel springs. Furthermore, shear compression springs require bonds between the steel plates and the elastomer members and in the event of failure of the bond, a failure could result in the suspension system. Almost all such systems require additional compression springs to provide full load stiffness.

In addition to the disadvantages regarding spring rate and load carrying capacity of prior art suspension systems, another important element in the consideration of a suspension system is the amount and type of damping in the system. There is much concern in the mobile vehicle industry regarding problems caused by dynamic forces which produce high frequency vibration, resonant motion, etc. Prior art damping systems to eliminate or reduce these problems have largely utilized constant force friction elements or costly hydraulic shock absorbers. Constant force damping has the disadvantage of being over-damped for light loads and under-damped for heavy loads. Hydraulic damping is velocity responsive rather than load responsive and also can allow damage to the lading for higher frequency forcing modes. Shear compression sandwich springs (whether chevron or flat) generally will provide only about 50% of the critical damping required for actual vehicle service without suffering from harmonic buildup.

Friction damping of dynamic forces action between a vehicle body and its rubber tired running gear have generally employed hydraulic shock absorbers as above or have been incorporated into the main load carrying spring of the vehicle as in U.S. Pat. Nos. 3,338,183; 3,517,620; 3,486,465 and 3,545,385.

Various types of elastomer springs have been designed heretofor. For example, elastomer springs are designed in the form of doughnuts, rectangles, etc. These configurations have not been highly successful for use in rubber tired vehicle suspensions. The doughnut, square and rectangular shapes occupy too great a volume for the tight space requirements of these suspensions and they all lack sufficient inherent damping. Square or rectangular shapes also provide less spring travel for a given height spring without over stressing them. Therefore, in limited space requirements, the desired deflection for a varying spring rate has not been practicably obtainable. Previously used elastomeric springs have seldom resulted in a satisfactory spring rate, even though they are non-linear, and have nearly always required ancillary shock absorbers.

SUMMARY OF THE INVENTION

The suspension system of this invention has been developed to provide an improved system of springing in the variable rate category by resilient elastomer means, which also include a variable friction damping system in conjunction with an adapter unit which provides the transitional part between the suspension spring elements and dampers and the vehicle structural members and bogie or truck members and the wheels, axles, bearings, etc.

With the suspension system of this invention, in conjunction with an adapter casting, fabrication or forging and its included friction damping springs and piston friction shoe elements, it is possible to vary the spring elements to provide a wide variety of non-linear spring curves to suit varying types of vehicles and their specific service requirements.

With the suspension system of this invention it is possible to select the angularity of the faces or surfaces against which the friction shoes mounted in the adapter unit operate. By designing the angularity of these friction plate surfaces to meet the particular spring curve and load conditions required, it can be demonstrated that the friction elements will follow, generally, the same spring curve as the main suspension spring elements, thereby producing the most efficient overall damped sprung suspension available.

The suspension system is load sensitive as are the friction damping units, as well as being very slightly velocity sensitive, which means that they can be very soft and one might say gentle in the light-loaded or empty vehicle condition and perform with much more stiffness or energy soak-up capability for the heavy vehicle condition.

By changing the durometer of certain of the spring elements, or of the damper spring elements, it is also possible to change the spring rate and the resulting spring curve. This technique is not available for use with either steel springs or elastomer sandwich type springs of the shear compression type, or air bag suspensions.

In the preferred embodiment for the spring elements of the suspension system, these elements are essentially rod-like springs of resilient elastomeric material of natural rubber or its equivalent, and may be completely cylindrical or have varying contours along the length of the cylinder to suit the specific requirements. The "rod springs" of the invention have a length greater than their width and are disposed for application of compressive load forces transversely to their longitudinal axes.

Because of the configuration and design of shear compression sandwich springs, it might be possible to mislocate the center of force if any of the shear compression sandwich members became unbonded. Since all forces are taken vertically through the suspension system of this invention directly in compression, there is no possibility of element separation because of the conditions referred to above.

The suspension provides an extremely valuable new technological break-through in the damping as well as springing area. A learned treatise commissioned by Rockwell Standard Corporation in 1967, Automotives Div., entitled Truck Ride Guide, Mr. William LeFevre, a Consulting Engineer, states un-equivocally that a rule is to limit suspension friction to not more than 5% of the suspension design load, and that friction damping simply has no place in rubber tired vehicles.

This information has probably directed people for a number of years in the direction of using only hydraulic shock absorbers in connection with rubber tired vehicle suspensions. If steel interleaf friction is considered to be the only type of suspension friction, Mr. LeFevre is probably correct, because steel spring leaf friction is constant friction and obviously would have to be too great for the light-loaded condition in order to react favorably for the loaded condition.

In the case of the suspension system of this invention, however, the friction damping is solid damping and variable according to load throughout the entire range of load conditions; therefore, expensive and relatively short lived hydraulic shock absorbers are no longer necessary to provide only the amount of critical damping necessary for a pre-selected median in the total range, and by utilizing this suspension system, much lower total suspension weights are feasible at a considerably lower cost.

Once again, the suspension system of this invention can be readily altered to suit the specific requirements of the vehicle damping spring elements, or by changing the angle of the friction damping relative to the adapter, or by changing the relative physical alignments of the elements of the damping system.

The adapter may be mounted on or incorporated into what is known as a "walking beam" for double-axle bogies, or can be mounted directly in conjunction with the axle itself by means of an elastomer bushing, which is commonplace in the auto and truck industries.

The combined variable spring rate and variable damping feature of this invention is obtained by using spring elements with different spring rates and in conjunction therewith providing spring biased friction damping means that engage a sloped surface the angularity of which is predetermined to compress the damping spring to produce a friction damping varying at the rate which can be selected to generally match the main vertical springing.

The suspension feature of the invention utilizes one or more vertically spaced elastomeric rod spring elements separated from one another by vertically spaced horizontal spacer plates. The spring rate can be varied by appropriate selection of rod spring configuration or modulus of elasticity with or without the use of mechanical stops to preclude overcompression of the spring.

In a tractor trailer vehicle, the rubber tires provide for lateral springing. The arrangement of the rod spring elements in the stack and the modulus of elasticity of the various spring elements is dependent to a great extent on the load capacity for which it is designed and the type of vehicle for which it is designed.

Also the rod spring elements may include diametrically opposed flat or concave surfaces against which compressive load bearing forces are directed. The provision of these flats, or similar surface modifications, alters the spring curve of the rod springs such that the rod springs are stiffer during initial deflection as the light weight of the vehicle is applied to the suspension but thereafter provide a softer spring action for heavily-loaded conditions. The rod spring elements thus function as though they were pre-loaded and, when other than flat opposed surfaces are used, produce other specifically desirable spring curve modifications.

A feature of one aspect of the invention is that when in service with a rotatable axis passing through the adapter, all of the spring elements and the damping elements may be positioned to balance the forces around the actual center of the rotatable axis within the suspension housing (whether a wheel axle, a semi-trailer walking beam pivot or an axis removed from the wheel axle or walking beam pivot). That is, all of the forces are resolved through the center horizontal transverse axis of the suspension, thus reducing undesirable moments that could increase wear or change the system spring loading or friction damping characteristics.

DESCRIPTION OF THE FIGURES OF THE DRAWING

FIGS. 3, 4 and 5 are transverse sections taken along the lines 3—3, 4—4 and 5—5 of FIG. 1.

FIG. 6 is a cross section of another embodiment of the suspension of this invention.

FIGS. 7, 8 and 9 are transverse sections taken along the lines 7—7, 8—8 and 9—9 of FIG. 6.

FIGS. 10 and 11 are cross sections of the FIGS. 6 and 7 embodiment depicting the FIGS. 6–7 embodiment as it would appear before application of the weight of the vehicle to the suspension.

FIG. 12 is a cross section of still another embodiment of the suspension of this invention.

FIG. 13 is a transverse section taken along the lines 13—13 of FIG. 12.

FIG. 14 is a side elevation of another walking beam suspension system embodiment.

FIG. 15 is a bottom plan view of the FIG. 14 suspension.

FIG. 18 is a perspective view of another embodiment of a rod spring for use in the suspension of this invention.

FIG. 19 is a cross section of a modified rod spring and mating surface embodiment.

FIG. 20 is a perspective view of an alternate friction damping surface element.

DETAILED DESCRIPTION OF PREFERRED EMBODIMENTS

Figure 1:
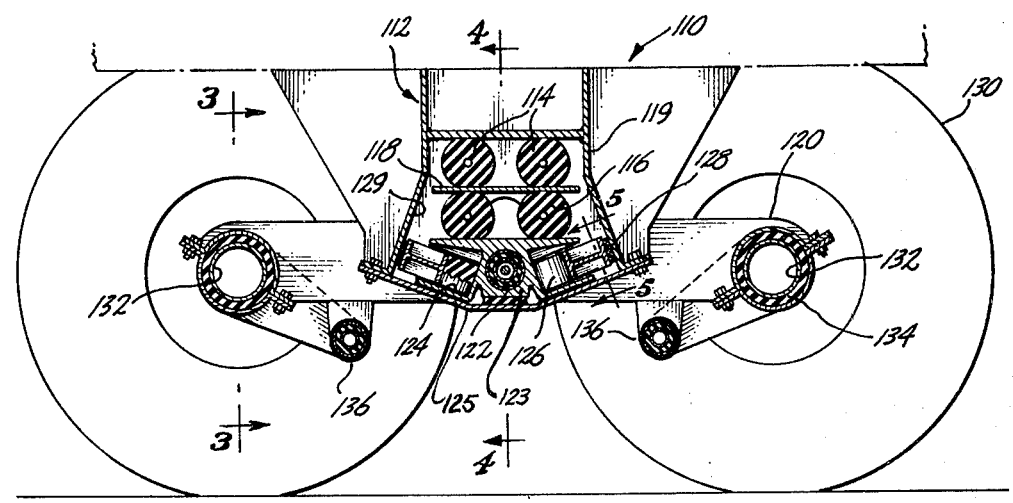
FIG. 1 is vertical section taken through a walking beam suspension system and embodying the principles of the invention.
Figure 2:
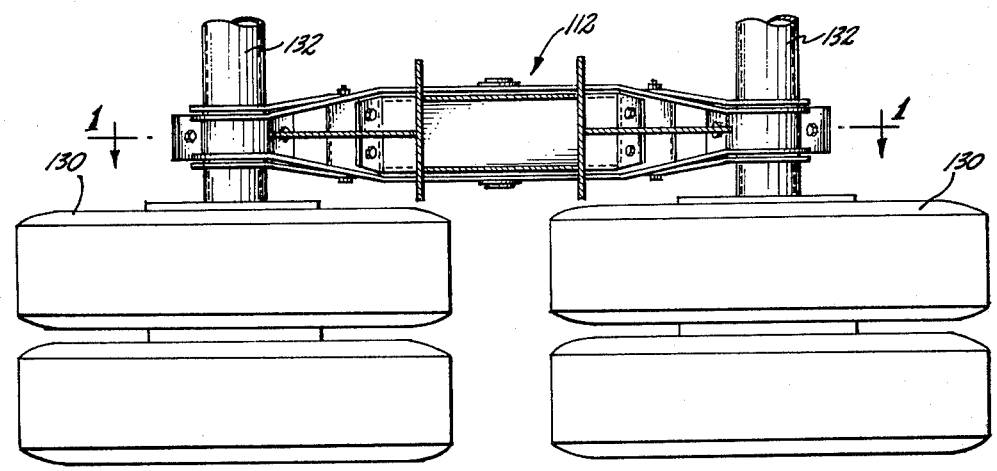
FIG. 2 is a plan view of the FIG. 1 suspension.
Figure 3:
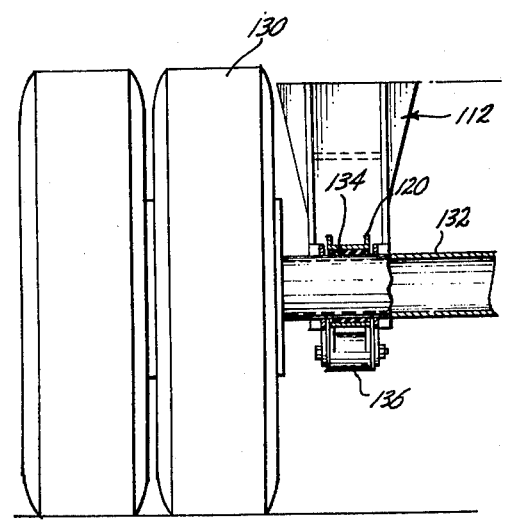
Figure 4:
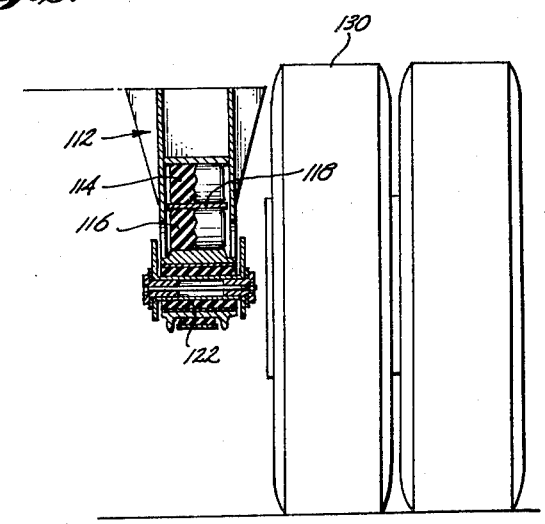

FIGS. 1–5 depict a walking beam suspension system as might be employed in a rubber tired tractor or trailer double axle bogie. This system comprises a sprung and damped suspension 112 secured to a vehicle 110 and journal mounted to a walking beam 120. The suspension 112 and walking beam 120 would be duplicated on the opposite side of the vehicle and two axles 132 are journal mounted as shown to the two walking beams for rotatably mounting tire sets 130.

The sprung and damped suspension 112 comprises a housing 119 secured to the vehicle framework by mounting flanges or webs 117, a carrier block 123 centered rotatably mounted on a stub shaft 121 by a bushing 122, and a retainer 125 that maintains the elements of suspension 112 together as a unit.

Housing 119 contains four resilient elastomeric rod spring elements 114–116 arranged in two tiers separated by a spacer plate 118. The spacer plate is supported by the rod springs free of the housing 119. Housing 119 is provided with a cross plate 113 against which bear the upper sides of rod springs 114. Carrier block 123 is provided with a flat upper surface 127 against which bear the lower sides of rod springs 116. These rod springs, under unloaded conditions are cylindrical with circular cross sections modified to provide diametrically opposed upper and lower flat surfaces.

By providing more than one tier of rod springs with each tier separated by a spacer plate, the rod spring material characteristics for each tier need not be identical.

The rod springs in one tier may be stiffer than the rod springs in the other tier if required to meet a desired overall spring curve. The spacer plate, while maintaining the rod springs in proper location during operation of the suspension, enables the rod springs in one tier to compress under both static and dynamic loadings independently of the rod springs in the other tier.

Although there is inherently in the rod springs a certain amount of internal damping dependent upon the modulus of elasticity of the elastomer used, it is insufficient to provide total damping necessary for most conditions experienced by vehicles. As an example, a rubber having approximately 15% internal damping in the embodiment illustrated may amount to less than 8% of critical (effective) damping for the total system for an application which may require as much as 20% of critical damping. The additional required damping is obtained from a unique variable damping system illustrated in FIG. 1.

The variable damping system of this invention varies with vertical distance on a varying exponential spring curve which is designed to closely match that of the main suspension rod spring elements and add cumulatively to the inherent damping of the main load bearing rod springs. The varying exponential spring rate provides a slowly changing rate under low loads and a rapidly increasing rate in the upper load range.

The friction dampers of this invention also provide load responsive lateral damping for the lateral pad springs where used. For this purpose, a horizontal lateral gap of about ¼ inch is provided on either side of the friction shoe element 128 to allow laterial movement. In the damping system of this invention elastomeric rod spring elements 126 (although volute or other variable rate springs can be used) are arranged in a pair of cylinders 124 spaced equidistantly from and on each side of the rotatable axis of stub shaft 122. A friction shoe element 128, of a conventional brake shoe type material having a coefficient of friction of approximately 0.4 is pushed by a rectangular piston 127, against a sloped surface 129 which latter is parallel to element 128. It can thus be readily recognized that lowering the housing 119 due to increased loads or dynamic forces acting on the suspension will move the sloped surfaces 129 downwardly, sliding the sloped surface past the friction shoe element 128 and compressing the spring elements. The greater the downward movement, the greater the outward force provided by the spring element 126 on the friction shoe element thus increasing the damping force applied through the system.

As is also readily apparent, the symmetric spacing of the friction shoes and spring elements balance the damping and springing moments on either side of the axle 122 thus reducing undesirable moments and tending to center the carrier at all times. It is of course, understood that the angle of the sloped surface and/or the modulus of elasticity and shape of the spring elements 126 can be varied to achieve the optimum damping configuration. Vertical guidance of the carrier block 123 to prevent fore and aft movement is provided by the friction shoes. Preferably, the damping is directly related to the spring force provided by the rod spring elements 114–116 and it is one of the advantages of this system that the unique relationship is established between the spring and damping forces such that both spring and damping forces increase at approximately the same rate under loading, dynamic or static. Thus where loads are high, the spring force is high and the damping force is high which is a desirable situation. When the loads are light, the spring force is low and the damping force is low, thus cushioning the shock to fragile light lading such as fruit.

In some instances, it is desirable to provide additional stability to the rod spring elements. For this purpose, as shown in FIG. 6, rod spring bosses 100a are provided that locate in recesses 100b. The bosses seated in the recesses provide locating and stability functions as well as allow ease of assembly and movement of the stacked springs to or from the housing 119. The bosses are spaced in from the longitudinal ends of the plates to minimize stress concentration at the ends of the elastomers.

In FIG. 6 rod spring elements 150–151 of a different arrangement are shown. In this embodiment, the rod springs are aligned longitudinally of the suspension rather than transversely as in FIG. 1. Also, each tier is composed of one, rather than two rod springs.

The damping spring elements 149 are also positioned with their axis normal to the plane of the drawing sheet rather than parallel to the plane. As seen in FIGS. 7–9, the FIG. 6 suspension has additional modifications to fit the suspension to a particular environment. The housing 153 and carrier 155 are modified to suit particular design parameters for a special trailer axle arrangement.

FIGS. 6, 8 and 9 also depict a modified damping system. Rather than providing a guide cylinder as at 124 in FIG. 1, for each friction shoe a pair of guide plates 157–159 are mounted by carrier 155 and are each provided with a guideway 161 into which the respective friction piston 163 is pivotally and slidably mounted. This pivoted mounting may be provided by a pivot pin 165 or by cylindrical bosses extending outwardly from the side walls of the friction piston 163 to pivotally and slidably engage the guideways 161. The guideways 161 may be provided in a replaceable channel 167 fabricated from wear resistant material. The lower rearward portion of each friction piston 163 is provided with a flanged portion 169 to insure retention of the spring element 149. The spring element 149 and back wall of the friction piston 163 are also provided with a mating boss and recess to stabilize the position of spring element 149.

The ability of the friction piston 163 to pivot as well as slide enables the friction damping system to accommodate unbalanced load or shock forces which tend to rock housing 153 or carrier 155 relative to one another. The FIG. 6 embodiment is particularly suited to mounting a moveable portion of a vehicle suspension which will shift position in an arcuate manner (and not simply vertically) in response to load and shock forces, particularly the latter. This would be the case, for example, in mounting a tractor axle that is driven by an elongated drive shaft such that the axle moves in response to shock forces about a remote pivot point at the swivel point of connection of the drive shaft to other parts of the vehicle drive train.

In this and similar applications, the housing 153 would be rigidly secured to the vehicle body or framework and, as a result, any force tending to bring the housing 153 and carrier together, for example, would tend to cause the opposing friction surface 171 and spring bearing surface 173 to become mis-aligned. The combined ability of the friction piston 163 to pivot and slide, however, will enable the friction shoe element 175 to remain in full friction contact with the friction surface 171.

In most instances, the guideways 161 are aligned normal to friction surface 171. If the guideways 161 are aligned such that an acute angle is formed between the axis of the guideways and friction surface 171, the friction piston 163 will have an increased component of vertical travel relative to vertical travel of the carrier 155 as carrier 155 travels upward. If the guideways 161 are aligned such that an obtuse angle is formed between the axis of the guideways and friction surface 171, friction piston 163 will have a decreased component of vertical travel relative to vertical travel of the carrier 155 as carrier 151 travels upward. With respect to vertical upward travel of carrier 155, an increased vertical travel component for the friction piston 163 will cause the spring element 149 to exert a greater friction damping force against the friction surface 171 and a decreased vertical travel component will result in the exertion of a lesser friction damping force. With respect to vertical downward travel of carrier 155, the obverse will be true. The same results may be obtained by shimming the member providing friction surface 171 so as to position friction surface 171 at a non-perpendicular angle to the axis of guideways 161, or by providing a member having a friction surface 171 that is not perpendicular to the axis of guideways 161.

FIGS. 10 and 11 depict the FIGS. 6 and 7 embodiment as it would appear without being loaded by the light weight of a vehicle. The rod springs (both the main spring elements 150–151 as well as damping spring elements 149) are shown uncompressed with their respective opposing flats clearly distinguishable. The friction shoe elements 175 are shown as just engaging the respective friction surfaces 171 such that essentially no friction damping occurs until application of the light weight of the vehicle causes damping spring elements 149 to be compressed and thereby urge the friction shoe elements 175 into frictional engagement with the respective friction surfaces 171. The corresponding rod spring elements of the other suspension embodiments depicted would have a similar appearance with the light weight of the vehicle removed.

Additionally, FIG. 6 depicts the member providing friction surface 171 as replaceable. An upper stop 179 is secured to housing 153, and inclined at an appropriate angle to hold the friction surface member when the latter is butted against the stop. The lower end of the friction surface member is secured to housing 153 by a recessed screw 181 which is threaded into housing 153 at an angle parallel to the angle of stop 179. As the friction surface member wears, a substitute friction surface member may be inserted between the worn member and housing 153. Upon the insertion of the substitute member, the worn member will be shifted downwardly such that the aperture, in the worn member, for screw 181 will remain aligned with threaded hole in housing 153. Thus, the screw 181 may be reinserted to secure both members. As a result, the worn member can continue to wear until it disintegrates and sluffs away to expose the fresh friction surface of the substitute member. Alternatively, the worn member could be removed after insertion of the substitute member. In either case, replacement of the worn member can be accomplished without dismantlement of the suspension since release of damping force urging friction shoe element 175 against friction surface 171 is not required. Alternately friction surface 171 may be provided by a wedge shaped element 171' as shown in FIG. 20 to provide multiple angularity for the friction shoes to act upon.

FIGS. 12 and 13 depict another suspension embodiment especially suitable for the rear axle suspension of low capacity, or light, trucks. This embodiment is generally similar to the FIG. 1 embodiment except that the rod springs 187 are oriented as in FIG. 6 rather than FIG. 1, and except that the suspension is inverted. In the embodiment of FIGS. 12 and 13, the suspension is secured between the vehicle frame rail 189 and axle-mounting trailing arm 191. For both connections, the suspension is journal mounted on stub shafts, 193–194 respectively, to the frame rail and to the trailing arm.

FIGS. 14 and 15 illustrate another form of a walking beam suspension system. In this embodiment, the walking beam constitutes a truss with the suspension secured as shown between the sides of the truss mid-section. This system is particularly suited to light weight trailers. The truss 205 is composed of two side frames 207–209 which join at each end in an axle journal 211. Each side frame has upper and lower members 213–214, which extend from one journal to the other, reinforcing members 215–217 extending between the upper and lower members, a center suspension mounting web 219 extending between upper and lower members 213–214, and end reinforcing plates 221–223–225 extending between the upper members and the lower members—respectively—adjacent to truss ends.

The mid-span between the truss side frames is designed to accommodate the suspension 312 which is journal mounted to the side frame webs 219 at 227. The suspension depicted is that shown in FIG. 1, designated 112.

Figure 16:
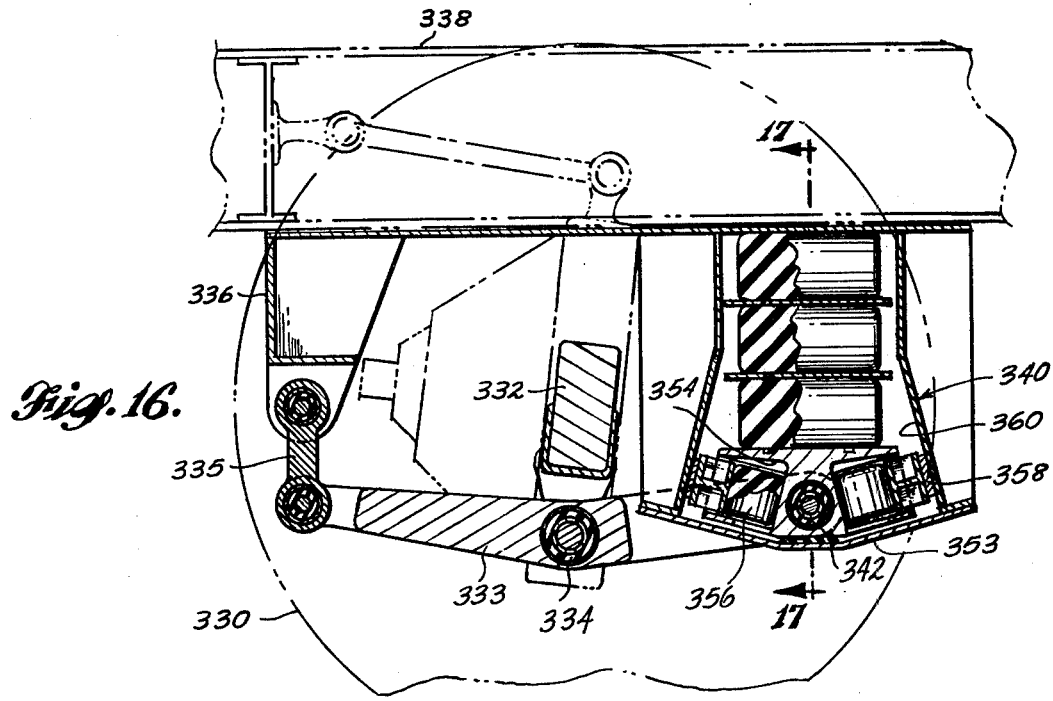
FIG. 16 is a cross section of a further embodiment of the suspension of this invention.
Figure 17:
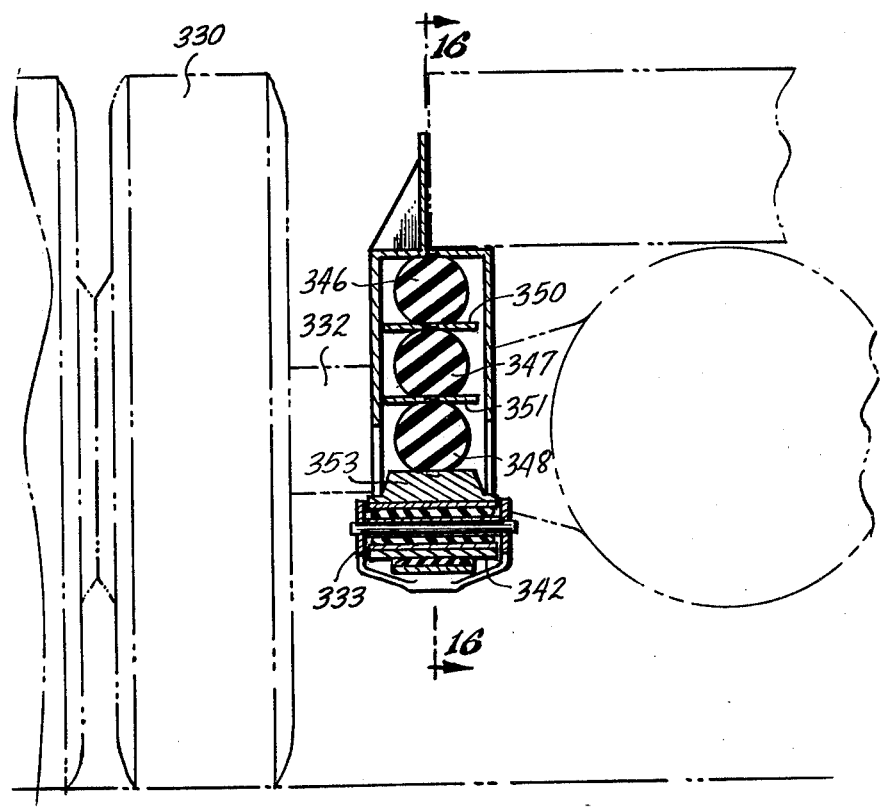
FIG. 17 is a transverse section taken along the lines 17—17 of FIG. 16.

FIGS. 16 and 17 illustrate another form of suspension system for single axled or a rubber tire vehicle. In this suspension wheels 330 are carried by an axle 332. The axle is pivotally secured to a beam 333 through a conventional rubber bushing 334. One end of the beam is pivotally coupled by a rubber bushing supported shackle 335 to a shackle bracket 336 which is fixed to a longitudinal side frame rail 338 of the vehicle. The opposite end of the beam is pivotally mounted to a suspension housing 340 by a bushing 342. The suspension housing 340 is basically the same as suspension housing 112 of FIGS. 1–4.

The suspension housing 340 includes three elastomeric rod springs 346, 347 and 348 spaced by upper and lower spacer plates 350 and 351, respectively. A carrier 353 rides on the bushing 342 and provides springs 356 and pistons which have friction shoes 358 as in the earlier embodiments to engage sloped side plates 360.

As is readily understood dynamic loading of the vehicle 338 will load the springs 346–348 and provide damping through side plates 360 and shoes 358 in much the same manner as in the embodiment of FIGS. 1-4.

As in some of the earlier described embodiments the damping and springing forces are symmetric resolved around the central axis of the bushing 342. It should be understood that in vehicles having sufficient space between the body frame and the wheel axle, the suspension can be placed directly over the wheel axle.

FIG. 19 depicts rod springs 150–151 with modified surface contours where they are mated with opposite contours in spacer plate 118. One or both housing surfaces may also be approximately contoured as at 115'. In some circumstances it could be desirable to only provide the metal surfaces with contours such as 115' and 118' such that the weight of the vehicle would deform the rod springs into conformance with the contours.

While the preferred embodiments of the invention have been illustrated and described, it should be understood that variations will be apparent to one skilled in the art. Accordingly, the invention is not to be limited to the specific embodiments illustrated.

We claim:

1. A rubber tired vehicle suspension which comprises load bearing spring means comprising at least one resilient rod spring composed of an elongated body of elastomeric material having opposed elongated longitudinal load bearing surfaces; and mounting means for attachment between the body and running gear of a vehicle, said mounting means carrying said rod spring in a position such that load bearing compressive forces are transmitted to said load bearing surfaces transversely of the rod spring longitudinal axis without producing rotation of said rod spring about its longitudinal axis with respect to said mounting means, while simultaneously therewith permitting the unloaded rod spring surfaces to bulge freely.

2. The suspension of claim 1 including at least one additional resilient elastomeric rod spring and a rod spring positioning member supported between and by the two rod springs independently of said mounting means to maintain the spacing and position of said rod springs relative to one another as said suspension is subjected to load bearing forces of varying magnitude and to enable said rod springs to react independently to load bearing forces.

3. The suspension of claim 1 wherein said rod spring bears against said mounting means, and wherein said rod spring and said mounting means include respective bearing surfaces provided with mating contours to secure said rod spring against dislocation.

4. The suspension of claim 1 wherein said rod spring has flats formed on opposite sides to provide two superimposed substantially parallel flat surfaces aligned generally perpendicularly to the direction of load bearing forces transmitted to said rod spring, at least one of said flat surfaces bearing against a coplaner flat surface provided by said mounting means such that load bearing forces are transmitted to said one flat surface.

5. The suspension of claim 1 wherein said rod spring is provided with opposing sides aligned generally perpendicularly to the direction of load bearing forces transmitted to said rod spring, such opposing sides having surface configurations that cause said rod spring to react as though pre-loaded.

6. The suspension of claim 2 wherein each rod spring has flats formed on opposite sides to provide two superimposed parallel flat surfaces aligned generally perpendicularly to the direction of load bearing forces transmitted to such rod spring; wherein one flat surface of one rod spring bears against a first coplaner flat surface provided by said mounting means, and the other flat surface of such rod spring bears against a first coplanar flat surface provided by said rod spring positioning member; and wherein one flat surface of the other rod spring bears against a second coplaner flat surface provided by said rod spring positioning member parallel to the positioning member first flat surface, and the other flat surface of such other rod spring bears against a second coplaner flat surface provided by said mounting means parallel to the first flat surface of said mounting means; and rod springs being aligned with respect to one another such that load bearing forces are transmitted from said mounting means to said rod springs and from one rod spring to the other rod spring across the respective coplaner bearing surfaces.

7. The suspension of claim 2 wherein each rod spring is provided with opposing sides aligned generally perpendicularly to the direction of load bearing forces transmitted to such rod spring, such opposing sides having surface configurations that cause said rod spring to react as though pre-loaded; wherein one such side of one rod spring bears against a first surface provided by said mounting means and the other such side of such rod spring bears against a first surface provided by said rod spring positioning member; and wherein one such side of the other rod spring bears against a second surface provided by said rod spring positioning member and the other side of such other rod spring bears against a second surface provided by said mounting means; said rod springs being aligned with respect to one another such that load bearing forces are transmitted from said mounting means to said rod springs and from one rod spring to the other rod spring across the respective bearing surfaces.

8. The suspension of claim 1 wherein said mounting means comprises first attachment means for attaching said mounting means to a vehicle body, and second attachment means for attaching said mounting means to a vehicle running gear, such two attachment means being positioned relative to one another such that said rod spring is carried between the two attachment means and maintains separation between the two attachment means as said suspension is subjected to load bearing forces.

9. The suspension of claim 8 wherein the two attachment means are provided with two opposing surfaces, one of which comprises a friction surface and the other of which comprises a spring bearing surface; and including a friction damping member slidably mounted by one attachment means and engaging said friction surface, and a resilient spring member positioned between said spring bearing surface and said friction damping member to engage said friction damping member with said friction surface, said friction surface and said friction damping member being positioned with respect to said mounting means such that said spring member causes said friction damping member to engage said friction surface with increasing force as a result of increasing load bearing force being transmitted to said rod spring.

10. The suspension of claim 9 wherein said spring member is an elastomeric rod spring aligned such that compressive forces are transmitted to said rod spring transversely of the longitudinal axis.

11. The suspension of claim 8 wherein the two attachment means are provided with two pair of opposing surfaces, one surface of each pair comprising a friction surface and the other surface comprising a spring bearing surface, each pair of opposing surfaces being positioned on opposite sides of said mounting means; and including a pair of friction damping members, one such member being slidably mounted by one attachment means and engaging one of said friction surfaces, and the other such member being slidably mounted by said one attachment means and engaging the other of said friction surfaces; and including a pair of resilient spring members, one such member being positioned between one of said spring bearing surfaces and one of said friction damping members, and the other such member being positioned between the other of said spring bearing surfaces and the other of said friction damping members, such spring members engaging the respective friction damping member with the respective friction surface; said friction surfaces and said friction damping members being positioned with respect to said mounting means such that said spring members cause said friction damping members to engage the respective friction surfaces with increasing force as a result of increasing load bearing force being transmitted to said rod spring.

12. The suspension of claim 11 wherein each of said spring members is an elastomeric rod spring aligned such that compressive forces are transmitted to said rod spring transversely of its longitudinal axis.

13. The suspension of claim 11 wherein said friction damping members are mounted by said one attachment means and positioned such that said spring members cause said respective friction damping members to engage the respective friction surfaces with substantially equal force.

14. The suspension of claim 9 including a friction damping member mounting means secured to said one attachment means and slidably mounting said friction damping member such that said friction damping member will remain in friction damping contact with said friction surface when said suspension is subjected to forces tending to cause said attachment means to become misaligned.

15. The suspension of claim 11 wherein the two friction surfaces are inclined with respect to one another such that the damping force increases with increasing load bearing force.

16. The suspension of claim 11 wherein said attachment means includes two wearable friction plates providing the two friction surfaces, each plate being mounted such that it can be replaced without dismantlement of the suspension.

17. The suspension of claim 9 including a friction damping member mounting means secured to said one attachment means and slidably mounting said friction damping member for movement toward and away from said friction surface at an angle non-perpendicular to said friction surface.

18. The suspension of claim 1 including damping means comprising at least one friction surface, a friction damping member slidably engaging said friction surface and a resilient spring member positioned to engage said friction damping member with said friction surface, said damping means being positioned with respect to said mounting means such that said spring member causes said friction damping member to engage said friction surface with increasing force as a result of an increasing load bearing force being transmitted to said rod spring.

19. The suspension of claim 18 wherein said mounting means includes friction damping member support means slidably mounting said friction damping member such that said friction damping member is guidably engaged against said friction damping surface by said spring member.

20. The suspension of claim 19 wherein said friction damping member support means includes a friction damping member guideway aligned non-perpendicular to said friction surface such that said friction damping member is moveable toward and away from said friction surface at an angle non-perpendicular to said friction surface.

21. The suspension of claim 19 including pivot means pivotally mounting said friction damping member to said friction damping member support means.

22. The suspension of claim 18 wherein said spring member is an elastomeric rod spring aligned such that compressive forces are transmitted to said rod spring transversely of its longitudinal axis.

23. A rubber tired vehicle suspension which comprises at least axle means; at least one pair of rubber tired wheels journaled on said axle means; a pair of suspension means secured to said axle means and positioned one adjacent the wheels; each said suspension means comprising a first support securing said suspension means to said axle means, a second support for securing said suspension means to the body of a vehicle, load bearing spring means comprising at least one resilient rod spring composed of an elongated body of elastomeric material having opposed elongated longitudinal load bearing surfaces and carried between the supports in a position such that load bearing compressive forces are transmitted to said load bearing surfaces transversely of the rod spring longitudinal axis without producing rotation of said rod spring about its longitudinal axis with respect to the supports, while simultaneously therewith permitting the unloaded rod spring surfaces to bulge freely.

24. The suspension of claim 23 wherein each of said suspension means includes at least one additional resilient elastomeric rod spring and a rod spring positioning member supported between and by the two rod springs independently of said support to maintain the spacing and position of said rod springs relative to one another as said suspension means is subjected to load bearing forces of varying magnitude and to enable said rod springs to react independently to load bearing forces.

25. The suspension of claim 24 wherein in each of said suspension means each rod spring has flats formed on opposite sides to provide two superimposed parallel flat surfaces aligned generally perpendicularly to the direction of load bearing forces transmitted to such rod spring, wherein one flat surface of one rod spring bears against a flat surface provided by said first support, and the other flat surface of such rod spring bears against a first coplaner flat surface provided by said rod spring positioning member, and wherein one flat surface of the other rod spring bears against a second coplaner flat surface provided by said rod spring positioning member parallel to the positioning member first flat surface, and the other flat surface of such rod spring bears against a coplaner flat surface provided by said second support parallel to the first support flat surface, said rod springs being aligned with respect to one another such that load bearing forces are transmitted from said supports to said rod springs and from one rod spring to the other rod spring across the respective coplaner bearing surfaces.

26. The suspension of claim 24 wherein in each of said suspension means each rod spring is provided with opposing sides aligned generally perpendicular to the direction of load bearing forces transmitted to such rod spring, such opposing sides having surface configurations that cause said rod spring to react as though preloaded; wherein one such side of one rod spring bears against a surface provided by said first support and the other such side of such rod spring bears against a first surface provided by said rod spring positioning member; and wherein one such side of the other rod spring bears against a second surface provided by said rod positioning member and the other side of such other rod spring bears against a surface provided by said second support; and rod springs being aligned with respect to one another such that load bearing forces are transmitted from said supports to said rod springs and from one rod spring to the other rod spring across the respective bearing surfaces.

27. The suspension of claim 23 wherein in each of said suspension means the supports are provided with opposing surfaces, one of which comprises a friction surface and the other of which comprises a spring bearing surface, and a friction damping member slidably mounted by one support and engaging said friction surface, and a resilient spring member positioned between said spring bearing surface and said friction damping member to engage said friction damping member with said friction surface, said friction surface and said friction damping member being positioned with respect to said supports such that said spring member causes said friction damping member to engage said friction surface with increasing force as a result of increasing load bearing force being transmitted to said rod spring.

28. The suspension of claim 27 wherein said spring member is an elastomeric rod spring aligned such that compressive forces are transmitted to said rod spring transversely of its longitudinal axis.

29. The suspension of claim 23 wherein in each of said suspension means the supports are provided with two pair of opposing surfaces, one surface of each pair comprising a friction surface and the other surface comprising a spring bearing surface, each pair of opposing surfaces being positioned on opposite sides of said supports, and includes a pair of friction damping members, one such member being slidably mounted by one support and engaging one of said friction surfaces and the other such member being slidably mounted by said one support and engaging the other of said friction surfaces, and includes a a pair of resilient spring members, one such member being positioned between one of said spring bearing surfaces and one of said friction damping members and the other such member being positioned between the other of said spring bearing surfaces and the other of said friction damping members, such spring members engaging the respective friction damping member with the respective friction surface, said friction surfaces and said friction damping members being positioned with respect to said mounting means such that said spring members cause said friction damping members to engage the respective friction surfaces with increasing force as a result of increasing load bearing force being transmitted to said rod spring.

30. The suspension of claim 29 wherein each of said spring members is an elastomeric rod spring aligned such that compressive forces are transmitted to said rod spring transversely of its longitudinal axis.

* * * * *